US012747691B2

(12) United States Patent
Duggleby et al.

(10) Patent No.: US 12,747,691 B2
(45) Date of Patent: Sep. 29, 2026

(54) ROTATING DETONATION ENGINE FOR POWER GENERATION

(71) Applicant: VENUS AEROSPACE CORP, Houston, TX (US)

(72) Inventors: Andrew Thomas Duggleby, Friendswood, TX (US); Nicholas D. Cardwell, Houston, TX (US)

(73) Assignee: VENUS AEROSPACE CORP, Houston, TX (US)

( * ) Notice: Subject to any disclaimer, the term of this patent is extended or adjusted under 35 U.S.C. 154(b) by 164 days.

(21) Appl. No.: 18/671,755

(22) Filed: May 22, 2024

(65) Prior Publication Data

US 2026/0009351 A1 Jan. 8, 2026

(51) Int. Cl.
*F02C 3/14* (2006.01)

(52) U.S. Cl.
CPC .................................... *F02C 3/14* (2013.01)

(58) Field of Classification Search
CPC .................................... F02K 9/42; F02K 9/95
See application file for complete search history.

(56) References Cited

U.S. PATENT DOCUMENTS

| | | | |
|---|---|---|---|
| 3,210,934 | A | 10/1965 | Smale |
| 3,237,864 | A | 3/1966 | Taylor et al. |
| 3,240,010 | A | 3/1966 | Morrison et al. |
| 3,383,855 | A | 5/1968 | Freeman et al. |
| 3,577,735 | A | 5/1971 | Schmidt |
| 3,651,644 | A | 3/1972 | Breen et al. |
| 4,073,138 | A | 2/1978 | Beichel |
| 4,236,378 | A | 12/1980 | Vogt |
| 5,307,624 | A | 5/1994 | Even-Nur et al. |
| 5,735,126 | A | 4/1998 | Schulte-Werning |
| 6,272,846 | B1 | 8/2001 | Schneider |
| 6,321,528 | B1 | 11/2001 | Polyanchik et al. |
| 8,245,494 | B2 | 8/2012 | DeDe et al. |
| 8,677,756 | B2 | 3/2014 | Poyyapakkam et al. |
| 8,858,224 | B2 | 10/2014 | Mungas et al. |
| 8,938,971 | B2 | 1/2015 | Poyyapakkam et al. |
| 8,959,921 | B2 | 2/2015 | Khan et al. |

(Continued)

FOREIGN PATENT DOCUMENTS

| | | | |
|---|---|---|---|
| CN | 2608844 | Y | 3/2004 |
| CN | 102287801 | B | 4/2013 |

(Continued)

OTHER PUBLICATIONS

U.S. Appl. No. 18/584,758, filed Feb. 22, 2024, Doshi et al.

(Continued)

*Primary Examiner* — Phutthiwat Wongwian
*Assistant Examiner* — Jacek Lisowski
(74) *Attorney, Agent, or Firm* — HAYES SOLOWAY P.C.

(57) ABSTRACT

A power generator system includes a turbine configured to be powered by a fluid flow including compressed air; one or more compressors configured to compress air; an eductor having (a) an air-augmented rotating detonation engine (RDE) as a component; and (b) a mixing section wherein an exhaust stream from the RDE and compressed air from the one or more compressors are mixed for pressure gain and delivery to the turbine; and a turbine power extractor configured to be driven by the turbine.

20 Claims, 6 Drawing Sheets

(56) References Cited

U.S. PATENT DOCUMENTS

| | | | | |
|---|---|---|---|---|
| 9,512,805 | B2 | 12/2016 | Snyder | |
| 9,598,323 | B2 | 3/2017 | Sackheim et al. | |
| 10,364,151 | B2 | 7/2019 | Wynn et al. | |
| 11,022,313 | B2 | 6/2021 | Boardman et al. | |
| 11,480,136 | B1 | 10/2022 | Smith | |
| 11,827,370 | B1 * | 11/2023 | Freer | B64D 27/08 |
| 11,840,988 | B1 | 12/2023 | Smith | |
| 2003/0046923 | A1 | 3/2003 | Dressler et al. | |
| 2008/0264372 | A1 | 10/2008 | Sisk et al. | |
| 2009/0007541 | A1 | 1/2009 | Kawaguchi et al. | |
| 2009/0102203 | A1 * | 4/2009 | Lu | F02C 5/12 290/40 R |
| 2011/0005193 | A1 | 1/2011 | Pavia et al. | |
| 2012/0060464 | A1 | 3/2012 | Grote et al. | |
| 2014/0245714 | A1 * | 9/2014 | Falempin | F23R 7/00 60/39.52 |
| 2014/0338358 | A1 * | 11/2014 | Lee | F01L 5/045 60/776 |
| 2015/0128597 | A1 | 5/2015 | Schlak | |
| 2015/0251766 | A1 | 9/2015 | Atkey | |
| 2015/0330869 | A1 | 11/2015 | Ziarno | |
| 2016/0076461 | A1 | 3/2016 | Kawai et al. | |
| 2016/0207631 | A1 * | 7/2016 | Suciu | B64D 27/18 |
| 2017/0146244 | A1 | 5/2017 | Kurosaka et al. | |
| 2018/0038316 | A1 | 2/2018 | Balepin | |
| 2018/0180289 | A1 | 6/2018 | Lavertu, Jr. et al. | |
| 2018/0231256 | A1 | 8/2018 | Pal et al. | |
| 2020/0063968 | A1 * | 2/2020 | Gutmark | F23R 7/00 |
| 2020/0386189 | A1 | 12/2020 | Powell et al. | |
| 2021/0140641 | A1 | 5/2021 | Singh et al. | |
| 2022/0205412 | A1 | 6/2022 | Duggleby | |
| 2022/0235727 | A1 * | 7/2022 | Wegener | F02K 9/62 |
| 2022/0252004 | A1 | 8/2022 | Yelken et al. | |
| 2023/0175459 | A1 * | 6/2023 | Reilly | F02K 9/66 60/224 |
| 2023/0220817 | A1 | 7/2023 | Duggleby | |
| 2023/0323809 | A1 | 10/2023 | Cross et al. | |
| 2023/0383711 | A1 | 11/2023 | Duggleby | |
| 2024/0018067 | A1 | 1/2024 | Wernimont et al. | |
| 2024/0093662 | A1 | 3/2024 | Duggleby | |

FOREIGN PATENT DOCUMENTS

| | | | |
|---|---|---|---|
| CN | 102269424 | B | 1/2014 |
| CN | 203604065 | U | 5/2014 |
| CN | 103993984 | A | 8/2014 |
| CN | 103670797 | B | 12/2015 |
| CN | 110552815 | B | 12/2020 |
| CN | 110631049 | B | 12/2020 |
| CN | 112177801 | A | 1/2021 |
| CN | 112254123 | A | 1/2021 |
| CN | 214038382 | U | 8/2021 |
| EP | 2146058 | B1 | 9/2011 |
| EP | 2496882 | B1 | 3/2018 |
| KR | 101777320 | B1 | 9/2017 |
| RU | 2271460 | C2 | 3/2006 |

OTHER PUBLICATIONS

U.S. Appl. No. 18/365,767, filed Aug. 4, 2023, Moradi et al.
U.S. Appl. No. 18/449,579, filed Aug. 14, 2023, Moradi et al.
U.S. Appl. No. 18/444,483, filed Feb. 16, 2024, Duggleby et al.
U.S. Appl. No. 18/151,385, filed Jan. 6, 2023, Duggleby.
Wessel, "How Rocket Engines Ignite", Headed for Space website, https://headedforspace.com/how-rocket-engines-ignite/ , accessed May 10, 2023, 7 pgs.
"JP-8", https://en.wikipedia.org/w/index.php?title=JP-8&oldid=1143819913 , accessed May 10, 3 pgs.
Guscinov, Sh. L., Hydrogen Peroxide Decomposition Catalysts Used in Rocket Engines, 2020, Russian Journal of Applied Chemistry, p. 467 (Year: 2020).
Rhodes, et al., "Dynamics of a Small-Scale Hydrogen Peroxide Vapor Propulsion System", Journal of Propulsion and Power, vol. 35, No. 3, May-Jun. 2019, pp. 595-600, 6 pgs.
"RS-25", Wikipedia, accessed Sep. 11, 2023, https://en.wikipedia.org/w/index.php?title=RS-25&oldid=1171888595, 24 pgs.
Hasegawa et al., "A Study of Compact Ram Combustor with Double-Staged Flameholders" Japan Society for Aeronautical and Space Sciences, vol. 50, No. 578, pp. 103-108, 2002, with English translation, 17 pages.
"De Laval nozzle" [Wikipedia webpage https://en.wikipedia.ord/wiki/De_Laval_nozzle accessed on May 24, 2024] (Year: 2024).

* cited by examiner

ROTATING DETONATION ENGINE FOR POWER GENERATION

TECHNICAL FIELD

The present disclosure relates to power generators and, more particularly, relates to the use of rotating detonation engines (RDEs) as eductors within a power generator.

BACKGROUND AND SUMMARY

This section provides background information related to the present disclosure which is not necessarily prior art. This section provides a general summary of the disclosure, and is not a comprehensive disclosure of its full scope or all of its features.

Gas turbine engines find applications in confined environments without the benefit of ram air, such as gas turbine engines that serve as auxiliary power units (APUs) in the tail sections of aircraft and/or as power units for land vehicles and stationary power units. Such gas turbine engines may have an external eductor coupled to the exhaust of the gas turbine engine to induce rapid airflow for cooling purposes, drawing ambient air around the exterior of the hot engine core by means of suitable ductwork.

The housing for the eductor circumscribes at least a portion of the combustor section of the engine, thereby cooling the combustor housing. It is common to mount an air-cooled heat exchanger over the inlet for the eductor that circulates and cools engine lubrication oil.

For best airflow, it is important that the eductor induce relatively uniform airflow around its entire perimeter. However, due to the sideward mounting of conventional eductor inlets coupled with the central mounting of the combustor housing, airflow tends to dominate along the length of the eductor proximate its inlet.

The foregoing discussion of the prior art derives from U.S. Pat. No. 8,245,494 in which there is described a gas turbine engine comprising: a combustor with an aft end exhaust nozzle that discharges along an axis of the combustor; an eductor with a housing that circumscribes the combustor; the eductor has a sideward eductor inlet with intakes generally normal to the combustor axis and an aft end eductor outlet that circumscribes the combustor exhaust nozzle and exhausts along the combustor axis; and an eductor distribution shield mounted within the eductor housing between the eductor inlet and the combustor with a deflection surface that deflects the intake of the eductor inlet around the combustor.

Conventionally, an RDE is an engine using a form of pressure gain combustion, wherein one or more detonations continuously travel around an annular channel. After the engine is started, the detonation wave is self-sustaining to maintain operation of the RDE—that is, the detonation of the fuel/oxidizer mixture in a segment of the channel releases the energy necessary to sustain the detonation rotationally in the direction of uncombusted fuel/oxidizer. The products of detonation combustion expand out of the channel perpendicular to the rotation, resulting in a propelling force. Throughout, an RDE may refer to an RDE that uses ambient air as an oxidizer (e.g., supplied by a compressor or ram scoop) or a rotating-detonation rocket engine (RDRE) which uses oxidizer from a tank.

RDEs theoretically are more efficient than conventional deflagrative combustion engines by as much as 25%. However, RDEs may suffer from instability and noise. Moreover, RDEs are relatively complex, and operate at elevated temperatures which creates cooling challenges, and which requires the use of expensive high temperature resistant materials. Also, pressure fluctuations inherent in an RDE's exhaust can damage the turbine blades required for power extraction. As a result of these disadvantages, the efficiency gains of RDEs generally have not justified their higher costs and complexities for use in power generators.

Referring to FIG. 1, which corresponds to FIG. 1 of our co-pending U.S. patent application Ser. No. 18/449,579, there is illustrated an RDE 10 that operates on the principle of rotating detonation. RDE 10 includes a mixing section 12 where fuel and oxidizer are mixed, a combustion chamber 14 where the fuel and oxidizer undergo combustion or deflagration, and a nozzle section 16 where the products of combustion expand out of the engine. Fuel is introduced from a fuel tank (not shown) via fuel nozzle 18 into mixing section 12, while oxidizer is supplied to mixing section 12 from an oxidizer tank (not shown) via oxidizer nozzle 20. By way of example, the oxidizer may comprise liquid $H_2O_2$, while the fuel may comprise liquid JP-8. The fuel and oxidizer are injected as liquid streams under high pressure through nozzles to form streams of fuel and oxidizer which impinge on one another at high relative velocities to cause atomization. The high-pressure liquid streams impinging on one another convert kinetic energy of the liquid droplets into increased surface area of the droplets. Upon chemical reaction within the oxidizer or between the oxidizer and fuel, sufficient heat is generated to cause thermal decomposition of the oxidizer into hot water steam and oxygen, which reacts with the liquid fuel droplets in combustion chamber 14. The products of combustion expand out of the combustion chamber 14 via combustion chamber annulus 30 into nozzle section 16, propelling the rocket forward. The reaction continues as long as fuel and oxidizer are supplied to the combustion chamber 14. RDE 10 also includes an ignition torch 22, and pumps, conduits, valves, controls, etc. (not shown) which are conventional and well known to those skilled in the art of RDE's.

FIG. 2 illustrates Applicant's internal prior art in which an air-augmented RDE 100 is employed as a component of an eductor 101 for a ram propulsion system 120. Air-augmented RDE 100 includes an injection nozzle 127 configured to inject an oxidizer such as high test peroxide (HTP) 124 and a fuel 126 driven by mechanically or electrically driven pumps (not shown), via the injection nozzle 127, into the inlet section 128 of the air-augmented RDE 100. The HTP and fuel react in RDE reaction chamber 133, and the products of the combustion expand out into a mixing chamber 134, and entrain, heat and expand compressed air from air compressor 129 being introduced into eductor 101 via air inlet 130. The hot exhaust from air-augmented RDE 100 entrains additional inlet air greater than that being supplied by an compressor 129 alone and adds sufficient temperature and pressure to the air so that the air when mixed with additional fuel 132 in ram combustion chamber 136 results in downstream ram combustion of the fuel in ram propulsion system 120. The combustion products from ram combustion chamber 136 are passed to nozzle section 138 which includes throat section 139 and diffuser section 140 for driving the ram propulsion system 142. Air-augmented RDE 100 preferably is positioned upstream and in line with ram combustion chamber 136 so as to provide uniform airflow to ram combustion chamber 136.

In accordance with the present disclosure, we mix the hot gas exhaust from an RDE and compressed air from conventional air compressor(s) to power a turbine power generator. More particularly, we incorporate an RDE as a component of an eductor in a compressed air power generator system resulting in a highly efficient power generator.

In accordance with one embodiment of the present disclosure, we employ an RDE as a component of an eductor in a compressed air power generator to power a stationary power generator.

In another embodiment, we employ an RDE as a component of an eductor of a compressed air generator to power a propulsion system for a land or water vehicle.

In another embodiment, we employ an RDE as a component of an eductor for a compressed air power generator to power a propulsion system for an aircraft.

More particularly, in one embodiment we provide a power generator system comprising: a turbine configured to be powered by a fluid flow including compressed air; one or more compressors configured to compress air; an eductor having (a) an air-augmented rotating detonation engine (RDE) as a component; and (b) a mixing section wherein an exhaust stream from the RDE and compressed air from the one or more compressors are mixed for delivery to the turbine; and a turbine power extractor configured to be driven by the turbine.

In one embodiment of our power generator system, the mixing section of the eductor is configured to mix the exhaust stream from the RDE and the compressed air and create a pressure gain between the mixed exhaust stream from the RDE and the compressed air and deliver the mixed stream from the RDE and the compressed air to the turbine.

In one embodiment of our power generator system the turbine power extractor comprises a transmission or a propellor.

In another embodiment of our power generator system the turbine power generator comprises an electrical generator or a pump.

In yet another embodiment of our power generator system, we include two or more air compressors configured for feeding compressed air to the eductor and to the RDE.

In one embodiment of our power generator system, the one or more compressors are mechanically driven.

In another embodiment of our power generator system, the one or more compressors are electrically driven.

In a further embodiment of our power generator system, one or more of the one or more air compressors is configured to boost air feed to the eductor to a pressure of 2-4 times atmospheres.

In a still further embodiment of our power generator system, one or more of the one or more air compressors is configured to boost air pressure to the air-augmented RDE to a pressure of 24-30 atmospheres.

In a still further embodiment of our power generator system, one or more of the one or more air compressors comprise axial compressors.

In yet another embodiment of our power generator system, one or more of the one or more air compressors comprise centrifugal compressors.

In still yet another embodiment of our power generator system the power generator is configured to power a vehicle.

In another embodiment of our power generator system the vehicle is selected from the group consisting of a land vehicle, a water vehicle, or an aircraft. When the vehicle is an aircraft, an inlet for the one or more compressors may be integrated into a wing of the aircraft.

In still yet another embodiment of our power generator system, the power generator is configured to power a stationary power generator.

In yet another embodiment of our power generator system one or more of the one or more air compressors are battery powered.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings, wherein like numerals depict like parts. The drawings described herein are for illustrative purposes only of selected embodiments and not all possible implementations and are not intended to limit the scope of the present disclosure.

In the drawings.

DETAILED DESCRIPTION

Figure 1:
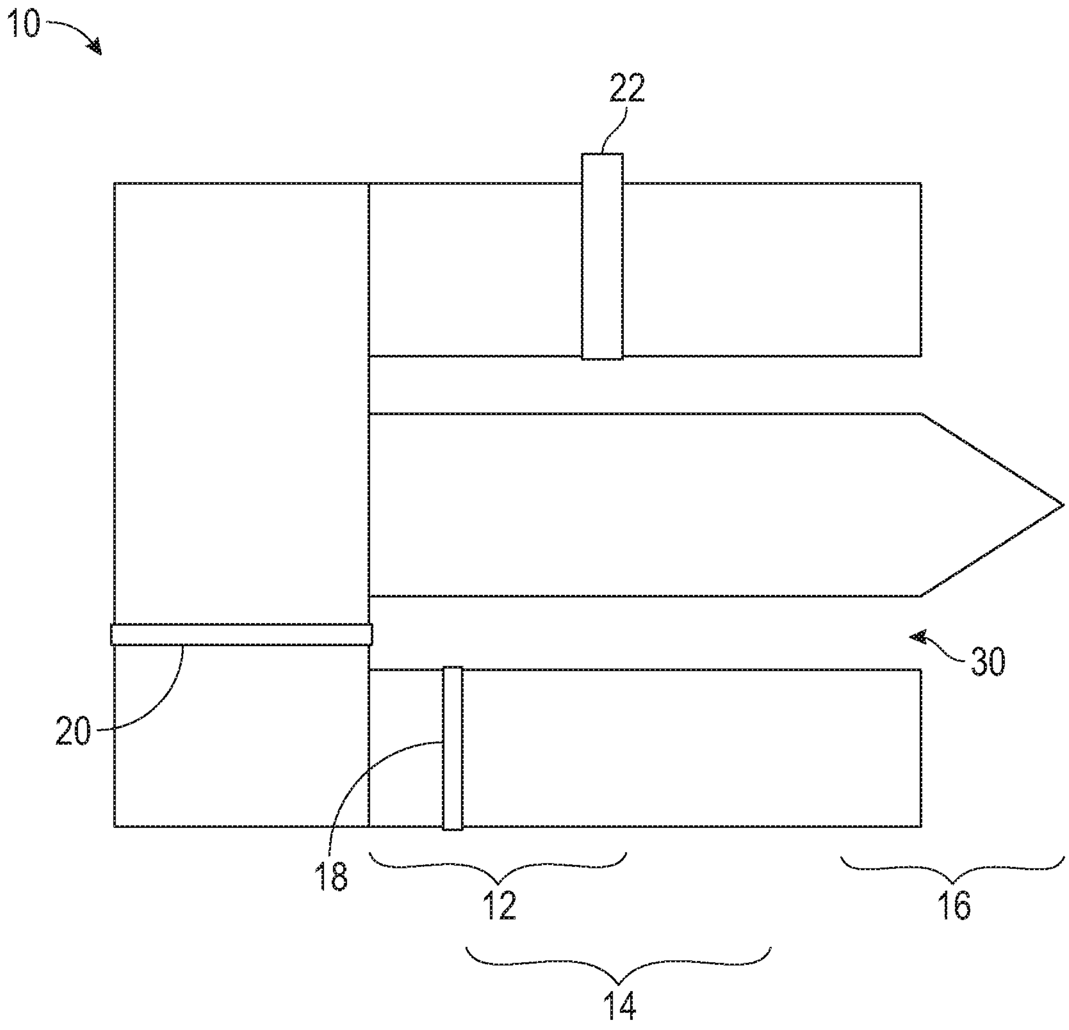
FIG. 1 (Prior Art)
FIG. 1 is a cross-sectional view of an RDE in accordance with the prior art.
Figure 2:
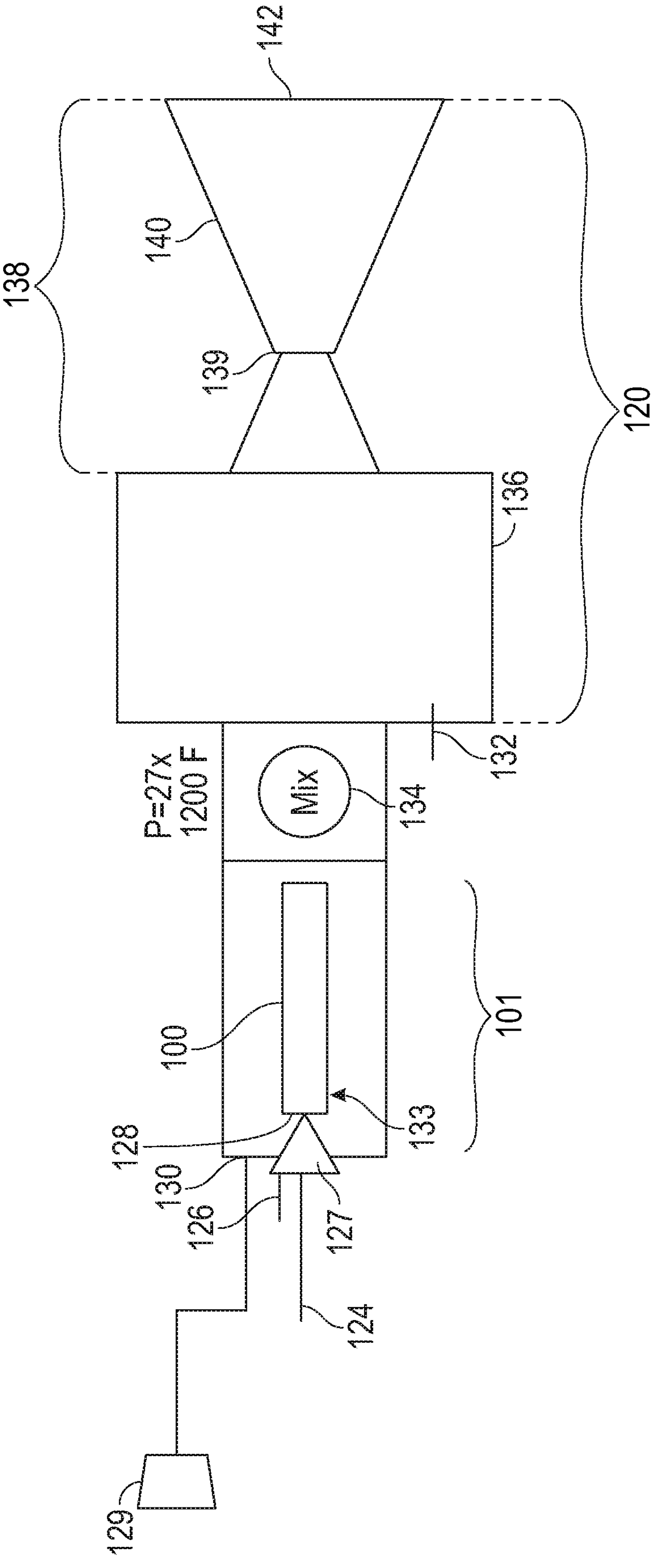
FIG. 2 (Prior Art)
FIG. 2 is a schematic view of a ram jet propulsion system incorporating an air-augmented RDE as a component of an eductor in accordance with Applicant's internal prior art.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, components, and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein the term "turbine power extractor" shall include mechanical devices that convert rotary energy from a turbine to useful power, including but not limited to propellors, transmissions, electrical power generators, pumps and the like.

As used herein "vehicle" may comprise a land vehicle, a water vehicle, or an aircraft.

Figure 3:
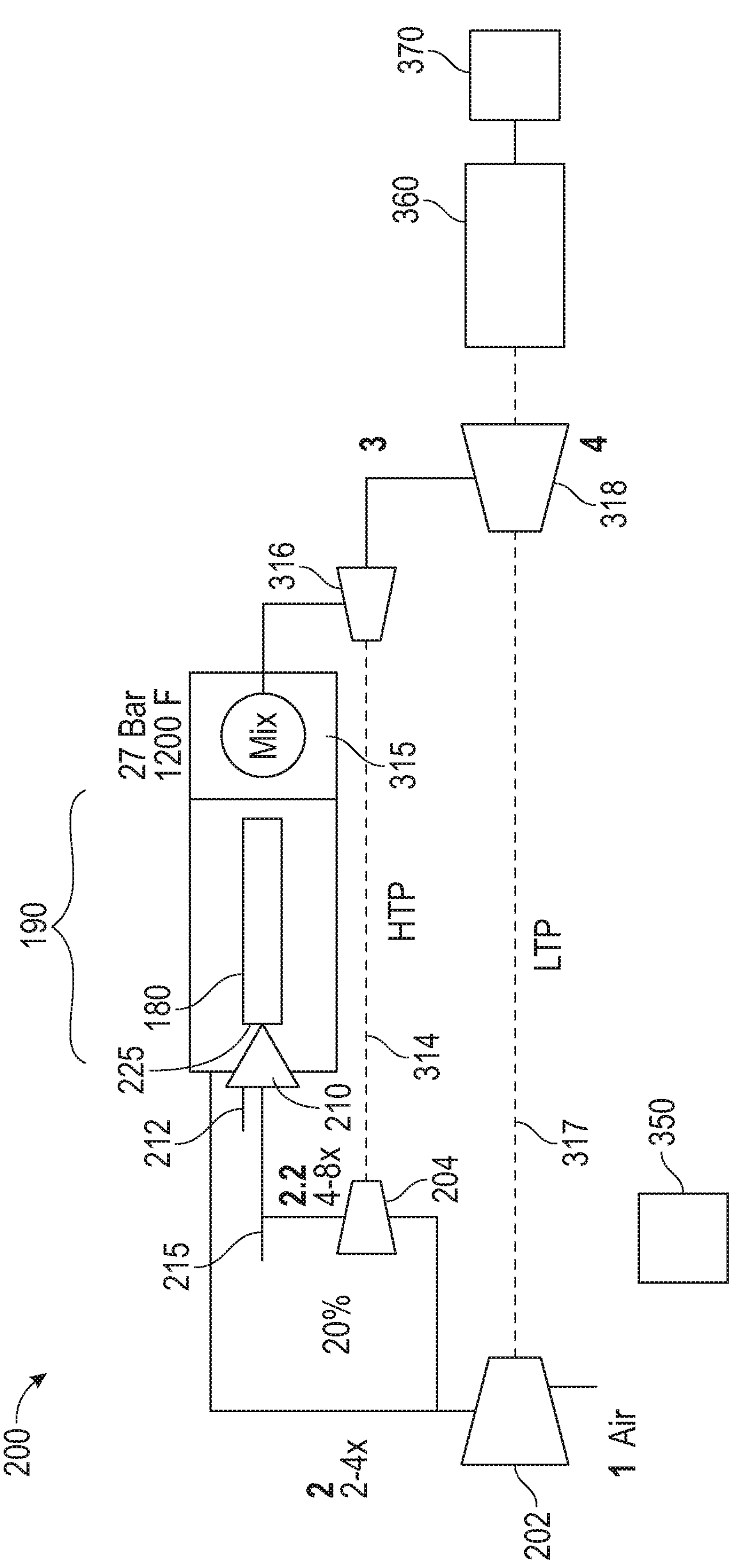
FIG. 3 is a schematic view of a turbine power generator system incorporating an air-augmented RDE as a component of an eductor in accordance with of the present disclosure.

FIG. 3 illustrates an air-augmented RDE 180 employed as a component of an eductor 190 in a compressed air turbine power generator system 200 in accordance with the present disclosure. Compressed air turbine power generator system 200 includes a first air compressor 202 configured to compress ambient air to raise the pressure of the air to a pressure of 2-4 atmospheres. A portion of the compressed air from first air compressor 202, e.g., 10-25 volume percent, is passed to a second air compressor 204 which is configured to raise the pressure of the air to a pressure of 24-30 atmospheres. Air compressors 202 and 204 may be axial air compressors or centrifugal air compressors, or a combination of axial air compressors and centrifugal air compressors. The output from compressor 204 is passed to an input of RDE 180 as will be described below, while the balance of the output of the first air compressor 202 is passed as input air to eductor 190. In some embodiments, the mixing for delivery to the turbine is aided by an eductor configuration mixing the streams (the supersonic rocket exhaust and the subsonic compressed air) before resulting in a shock with pressure gain before delivery to the turbine. An additional benefit is smoothing out the flow delivered to the turbine which would otherwise be incompatible with an RDE.

The hot gas exhaust 234 (shown in FIG. 4) from air-augmented RDE 180 is mixed with the 2-4 atmosphere pressure air in mixing section 315 and passed first through series connected first and second turbines 316, 318, respectively, which convert the kinetic energy of the hot gas exhaust to mechanical rotary energy. The rotary energy from turbine 316 is employed to drive air compressor 204 via drive shaft 314, while the rotary energy from turbine 318 is employed to drive the drive shaft 317, which in turn drives air compressor 202 and turbine power extractor 360 which may be a propeller, an electrical power generator, a transmission, a pump or the like. Alternatively, compressors 202, 204, may be electrically driven by an electric power created by electrical power generator 370 driven by energy harvested by turbine power extractor 360.

Figures 4, 4A:
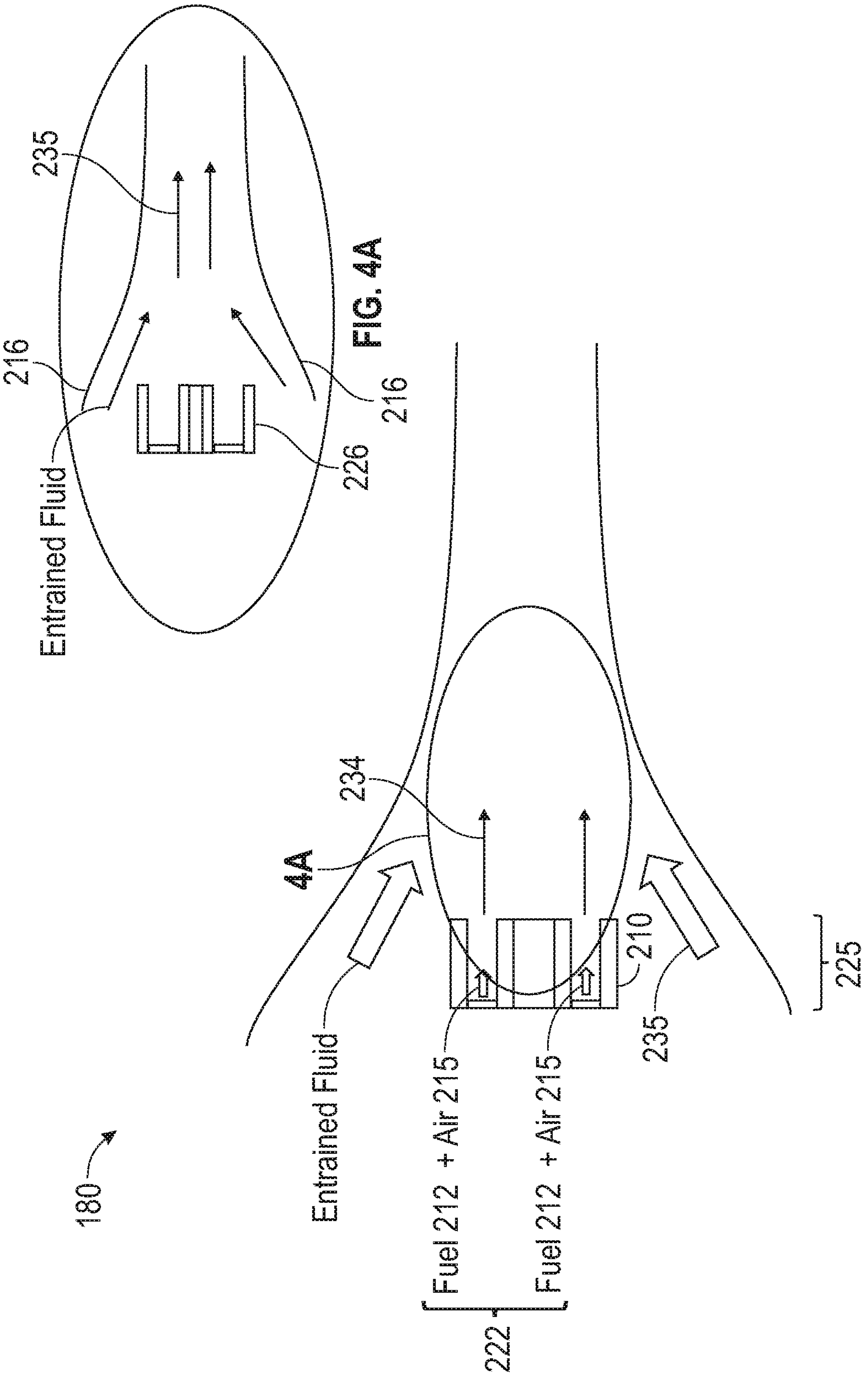
FIG. 4 is a cross-sectional view of the RDE of FIG. 3.
FIG. 4*a* is an enlarged view of a portion of the RDE of FIG. 4.

Referring also to FIGS. 4 and 4*a*, the air-augmented RDE 180 includes a propellant introduction system 222 configured to introduce a fuel 212 and air 215, into an inlet section 225 of the air-augmented RDE 180. Propellant introduction system 222 comprises a feed nozzle 210 centrally disposed within inlet section 225 having an annulus area 226 generally surrounding centrally disposed feed nozzle 210. The shape of annulus area 226 is defined by a space or volume between a converging surface of inlet section 216 and the outer surface of feed nozzle 210. Feed nozzle 210 comprises a convergent section configured to drive the air and fuel flow therethrough to a supersonic Mach number resulting in combustion of the fuel as described in US Patent Application Publication No. US 2023/0383711 (the '711 publication), the contents of which are incorporated herein by reference, producing a hot gas exhaust. As discussed in the '711 publication feed nozzle 210 is configured to receive the air and to drive the air to an air stream 235 flow speed sufficient to educt the fuel and stabilize a detonation wave.

The RDE hot gas exhaust adds heat and pressure to the compressed air, expanding the air resulting in improved efficiency:

40% efficiency à 55% efficiency 215 g/kwh à 155 g/kwh

An additional benefit of employing an RDE as a component of an eductor in a compressed air power generator system to power a turbine power extractor in accordance with the present disclosure, is that pressure fluctuations from the RDE, that otherwise might compromise turbine blades of a turbine power extractor, are smoothed out.

Figure 5:
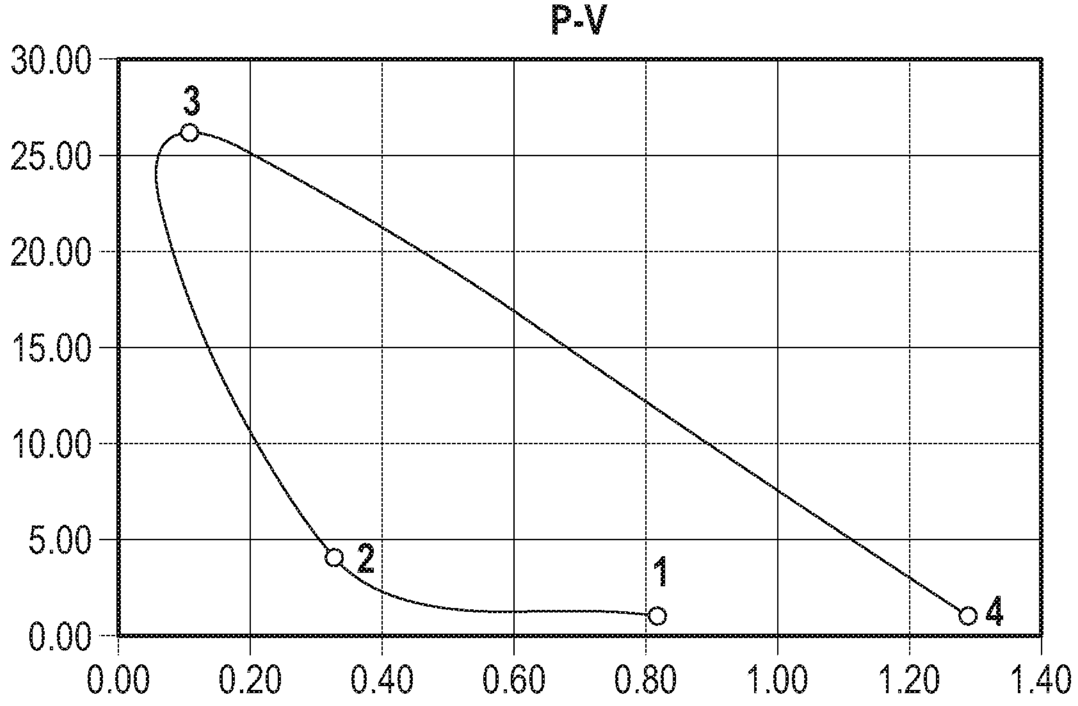
FIG. 5 plots air pressure gain employing an RDE as a component of an eductor in the turbine power generator system of FIG. 3, in accordance with the present disclosure.

FIG. 5 plots the pressure boost of air achieved by the system of FIGS. 3-4*a* wherein compressor 202 compresses ambient air (point 1 on FIG. 5) to 2-4× ambient pressure (point 2 on FIG. 5), compressor 204 takes 10-25% of compressor 202 output and re-compresses the air to 24-30× ambient pressure (point 3 on FIG. 5).

Figure 6:
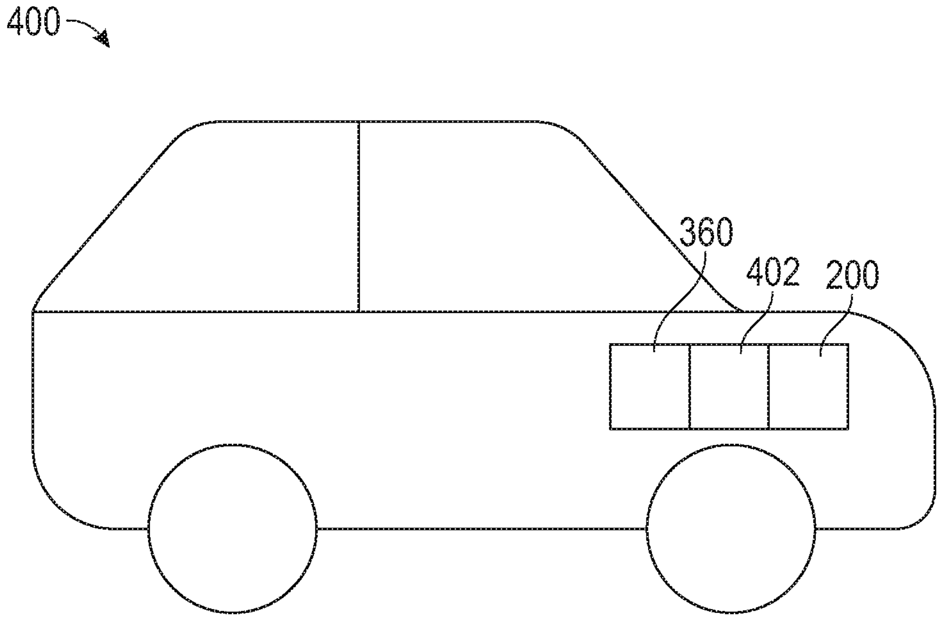
FIG. 6 is a schematic view of a land vehicle incorporating the air-augmented RDE powered-power generator system of FIG. 3.

FIG. 6 schematically illustrates a motor vehicle 400 powered by a compressed air turbine power generator system 200 of FIG. 3, including a gearbox 402 and a turbine power extractor 360 in accordance with the present disclosure.

Figure 7:
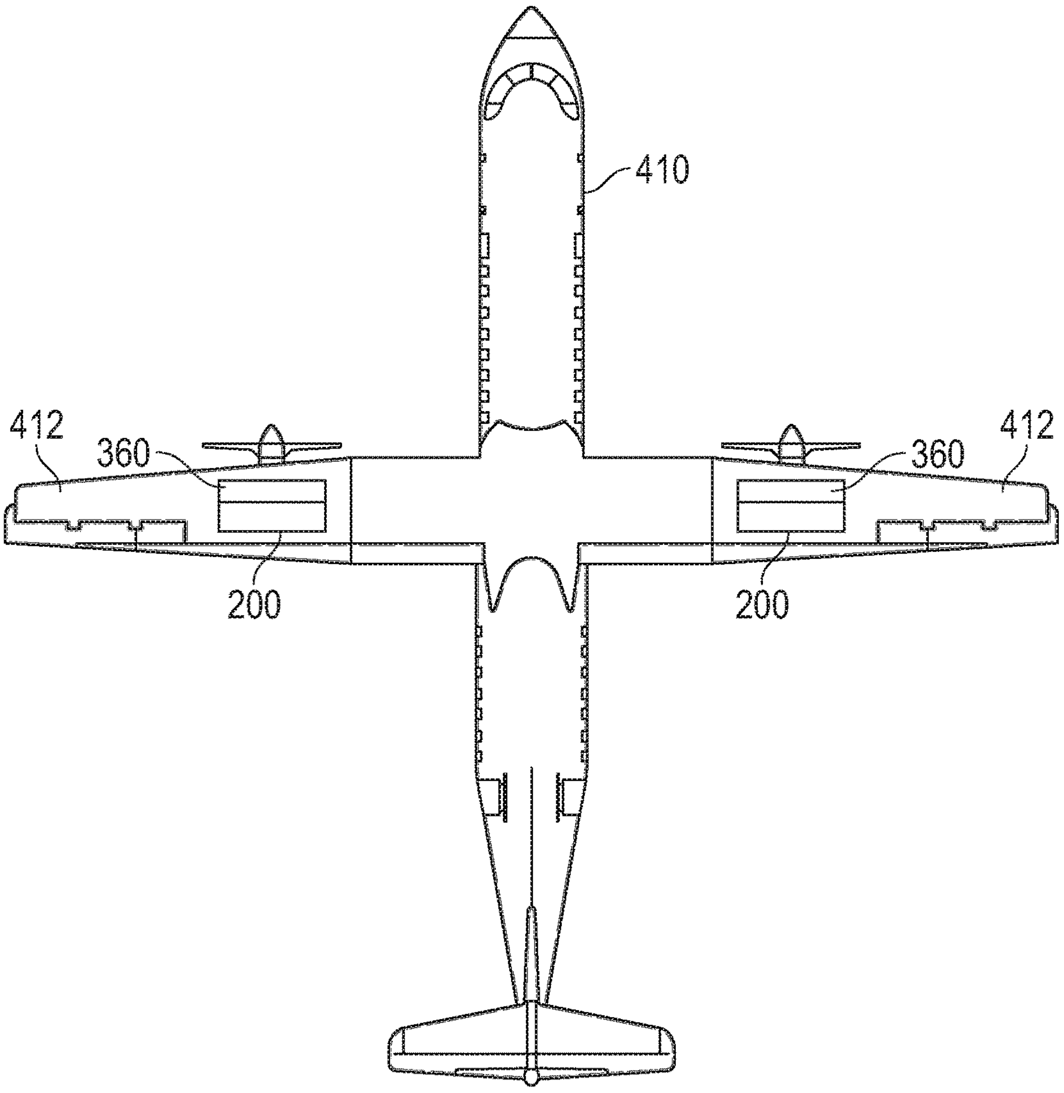
FIG. 7 is a schematic view of an aircraft incorporating the air-augmented RDE powered-power generator system of FIG. 3.

FIG. 7 schematically illustrates an aircraft 410 a compressed air turbine power generator system 200 of FIG. 3. In the case of an aircraft, in one embodiment we incorporate a compressed air turbine power generator system 200 and a turbine power extractor 360 in the wing 412 of the aircraft 410 to provide boundary layer air ingestion to the RDE. Integrating the air-augmented RDE in the wing 412 of the aircraft 410 has an advantage over turbo fan/propeller-based boundary ingestion which chops up airflow.

Figure 8:
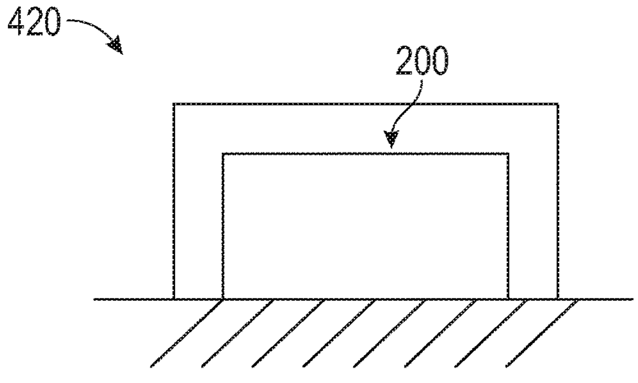
FIG. 8 is a schematic view of a stationary power generator system incorporating the air-augmented RDE powered-power generator system of FIG. 3.

FIG. 8 schematically illustrates a stationary power generator system 420 powered by an air-augmented system powered by a compressed air turbine power generator system 200 in accordance with the present disclosure.

Various changes may be made in the above disclosure without departing from the spirit and scope thereof. For example, one or more of the compressors could be electrically powered which has an advantage of providing more instant power generation and of eliminating a need for drive shafts 314, 317. Also, if desired, one or more of the compressors could be supplemented by battery power 350 which has an advantage of providing essentially instant power generation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

LIST OF REFERENCES

10 RDE
12 mixing section
14 combustion chamber
16 nozzle section
18 fuel nozzle
20 oxidizer nozzle
22 ignition torch
30 combustion chamber annulus
100 air-augmented RDE
101 eductor
120 ram propulsion system
124 high test peroxide
126 fuel
127 injection nozzle
128 inlet section
129 air compressor
130 air inlet
132 additional fuel
133 reaction chamber
134 mixing chamber
136 ram combustion chamber
138 nozzle section
139 throat section
140 diffuser section
142 ram propulsion system
180 air-augmented RDE
190 eductor
200 compressed air turbine power generator system
202 first air compressor
204 second air compressor
210 feed nozzle
212 fuel
215 air
216 inlet section
222 propellant introduction system
226 annulus area
225 inlet section
234 hot gas exhaust
235 air stream
314 drive shaft
315 mixing section
316 first turbine
317 drive shaft
318 second turbine
350 battery power
360 turbine power extractor
370 electrical power generator
400 motor vehicle
402 gearbox
410 aircraft
412 wing
420 stationary power generator system

What is claimed:

1. A power generator system comprising:

a turbine configured to be powered by a fluid flow including the compressed air;

one or more compressors configured to compress air;

an eductor having (a) an air-augmented rotating detonation engine (RDE) as a component; and (b) a mixing section configured to mix a supersonic exhaust stream from the RDE with subsonic compressed air from the one or more compressors for delivery to the turbine; and a turbine power extractor configured to be driven by the turbine.

2. The power generator system of claim 1, wherein the mixing section of the eductor is configured to mix the exhaust stream from the RDE and the compressed air and create the pressure gain between the mixed exhaust stream from the RDE and the compressed air and deliver the mixed stream from the RDE and the compressed air to the turbine.

3. The power generator system of claim 1, wherein the turbine power extractor comprises a transmission or a propeller.

4. The power generator system of claim 1, wherein the turbine power extractor comprises an electrical generator or a pump.

5. The power generator system of claim 1, comprising two or more air compressors configured for feeding the compressed air to the eductor and to the RDE.

6. The power generator system of claim 1, wherein the one or more compressors are mechanically driven.

7. The power generator system of claim 1, wherein the one or more compressors are electrically driven.

8. The power generator system of claim 1, wherein one or more of the one or more air compressors is configured to boost air feed to the eductor to a pressure of 2-4 times atmospheres.

9. The power generator system of claim 5, wherein one or more of the one or more air compressors is configured to boost air pressure to the air-augmented RDE to a pressure of 24-30 atmospheres.

10. The power generator system of claim 5, wherein one or more of the one or more air compressors comprise axial compressors.

11. The power generator system of claim 5, wherein one or more of the one or more air compressors comprise centrifugal compressors.

12. The power generator system of claim 1, wherein the power generator system is configured to power a vehicle.

13. The power generator system of claim 12, wherein the vehicle is selected from a group consisting of a land vehicle or a water vehicle.

14. The power generator system of claim 12, wherein the vehicle comprises an aircraft.

15. The power generator system of claim 14, wherein an inlet for the one or more compressors is integrated into a wing of the aircraft.

16. The power generator system of claim 1, wherein the power generator system is configured to power a stationary power generator.

17. The power generator system of claim 1, wherein one or more of the one or more compressors are battery powered.

18. The power generator system of claim 1, wherein the one or more compressors comprise a first air compressor configured to compress ambient air to a pressure of 2-4 times atmospheric pressure, and a second air compressor configured to receive a portion of the compressed air from the first air compressor and further compress the air to a pressure of 24-30 times the atmospheric pressure, wherein an output of the second air compressor is passed to the RDE and a balance of the output of the first air compressor is passed as input air to the eductor.

19. The power generator system of claim 18, wherein the portion of the compressed air from the first air compressor passed to the second air compressor comprises 10-25 volume percent of the output of the first air compressor.

20. The power generator system of claim 18, further comprising a first turbine and a second turbine connected in series, wherein the first turbine is configured to drive the second air compressor, and the second turbine is configured to drive the first air compressor and the turbine power extractor.

* * * * *